(12) United States Patent
De Cristofaro et al.

(10) Patent No.: US 9,275,237 B2
(45) Date of Patent: Mar. 1, 2016

(54) METHOD AND APPARATUS FOR PRIVACY AND TRUST ENHANCING SHARING OF DATA FOR COLLABORATIVE ANALYTICS

(71) Applicant: Palo Alto Research Center Incorporated, Palo Alto, CA (US)

(72) Inventors: Emiliano De Cristofaro, London (GB); Julien F. Freudiger, Mountain View, CA (US); Ersin Uzun, Campbell, CA (US); Alejandro E. Brito, Mountain View, CA (US); Marshall W. Bern, San Carlos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 60 days.

(21) Appl. No.: 14/101,148

(22) Filed: Dec. 9, 2013

(65) Prior Publication Data

US 2015/0161398 A1    Jun. 11, 2015

(51) Int. Cl.
*G06F 21/60* (2013.01)
(52) U.S. Cl.
CPC ..................................... *G06F 21/60* (2013.01)
(58) Field of Classification Search
None
See application file for complete search history.

(56) References Cited

U.S. PATENT DOCUMENTS

| 2008/0133531 | A1* | 6/2008 | Baskerville | ......... G06F 21/6254 |
| 2010/0017870 | A1* | 1/2010 | Kargupta | ............ H04L 63/1408 726/14 |

OTHER PUBLICATIONS

Blundo, C. De Cristofaro, E., Gasti, P., "EsPRESSo: Efficient Privacy-Preserving Evaluation of Sample Set Similarity", R. Di Pietro et al. (Eds.): DPM 2012 and SETOP 2012, LNCS 7731, pp. 89-103, 2013. Copyright Springer-Verlag Berlin Heidelberg 2013.*
Katti, S., Krishnamurthy, B., Katabi, D., "Collaborating Against Common Enemies", IMC '05 Proceedings of the 5th ACM SIGCOMM conference on Internet Measurement, USENIX Association Berkeley, CA, USA, pp. 365-378, Copyright 2005.*
Zander, S., Andrew, L., Armitage, G., "Scalable Private Set Intersection Cardinality for Capture-Recapture with Multiple Private Datasets", CAIA Technical Report 130930A, pp. 1-14, Copyright Sep. 2013.*

(Continued)

*Primary Examiner* — Andrew Nalven
*Assistant Examiner* — Christopher Ruprecht
(74) *Attorney, Agent, or Firm* — Shun Yao; Park, Vaughan, Fleming & Dowler LLP

(57) ABSTRACT

One embodiment of the present invention provides a system for privacy-preserving sharing of data for secure collaboration. During operation, the system obtains a first set of data describing network events associated with one or more network addresses. Next, the system negotiates with a potential partner to determine a metric for deciding whether to share data. The potential partner is associated with a second set of data describing network events. The system then computes a value for the metric in a privacy-preserving way, based on the first set of data and the second set of data. Subsequently, the system determines whether the metric value exceeds a predetermined threshold, and, responsive to determining that the metric value exceeds the predetermined threshold, the system shares the first set of data with the potential partner, while controlling how the data should be shared to optimize benefits and risks of collaboration.

24 Claims, 8 Drawing Sheets

(56) References Cited

OTHER PUBLICATIONS

Li, F., Chen, Y., Luo, B., Lee, D., Liu, P., "Privacy Preserving Group Linkage", J.B. Cushing, J. French, and S. Bowers (Eds.): SSDBM 2011, LNCS 6809, pp. 432-450, 2011. Copyright Springer-Verlag Berlin Heidelberg 2011.*

Lincoln, P., Porras, P., and Shmatikov, V.; "Privacy-Preserving Sharing and Correlation of Security Alerts"; Proceedings of the 13th Conference on USENIX Security Symposium—vol. 13; USENIX Association, Aug. 2004.*

* cited by examiner

PRIVATE SET INTERSECTION (PSI)

OBLIVIOUS PSEUDO-RANDOM FUNCTION

PRIVATE SET INTERSECTION CARDINALITY (PSI-CA)

METHOD AND APPARATUS FOR PRIVACY AND TRUST ENHANCING SHARING OF DATA FOR COLLABORATIVE ANALYTICS

BACKGROUND

1. Field

The present disclosure relates to secure collaboration and data sharing for better analytics. More specifically, this disclosure relates to a method and system that allows organizations to collaborate while protecting the privacy of their data.

2. Related Art

Organizations today are exposed to an increasingly large number of cyber threats, including malware and software vulnerabilities as well as botnet, zeroday, and denial of service attacks. In compliance with risk management frameworks, industry practices usually recommend implementation of standard security countermeasures, such as firewalls, antivirus software, patch management, and security/log audits.

Some security solutions go beyond passive defense mechanisms and offer proactive measures to predict attackers' next move. Prediction techniques rely on attack information—so-called "security data"—that companies retain: Internet Protocol (IP) addresses, domains, Uniform Resource Locators (URLs), hostnames, vulnerabilities, phishing emails, metadata (e.g., attack technique, malware, activity description), incident parameters, Threats Techniques and Procedures (TTPs), etc. The more security data a company has, the better the understanding of adversarial strategies and thus the success of its prediction techniques.

Threat modeling requires as much information as possible about threats but information is usually scarce. In practice, companies have a limited view of malicious cyber activities and can only achieve limited prediction performance. Previous work showed that collaboration would curb this challenge as companies are often hit by the same attacks (see, e.g., Zhang, J. and Porras, P. and Ulrich, J. Highly Predictive Blacklisting. Proceedings of Usenix Security, 2008). Therefore, companies can enhance the accuracy of security intelligence and analytics mitigation techniques if companies share security data with each other, thereby increasing the availability of information about attacks.

Unfortunately, a number of problems often prevent companies from sharing security data. Furthermore, similar problems exist not only for sharing security data, but also extend to sharing other types of data, including financial data, to the detriment of companies that would otherwise benefit from collaboration. Some companies may have people manually parse and approve the sharing of secure information, which is unacceptably slow. Other obstacles to information sharing include trust issues, legal liability (e.g., negligence, exposure of customer data, shareholder duty), competitive concerns (e.g., collusion, no tangible incentives), as well as concerns with the reliability and quality of shared data.

SUMMARY

One embodiment of the present invention provides a system for privacy-preserving sharing of data for secure collaboration. During operation, the system obtains a first set of data describing network events associated with one or more network addresses. Next, the system negotiates with a potential partner to determine a metric for deciding whether to share data. The potential partner is associated with a second set of data describing network events. The system then computes a value for the metric in a privacy-preserving way, based on the first set of data and the second set of data. Subsequently, the system determines whether the metric value exceeds a predetermined threshold, and, responsive to determining that the metric value exceeds the predetermined threshold, the system shares the first set of data with the potential partner, while controlling how the first set of data or subsets of the first set of data should be shared to optimize benefits and risks of collaboration.

In a variation on this embodiment, the metric is a Jaccard index, and computing the metric value includes the system computing a size of an intersection between the first set of data and the second set of data in a privacy-preserving way. The system then computes the size of the union between the first set of data and the second set of data by adding the size of the first set of data to the size of the second set of data and subtracting the size of the intersection. The system then computes the Jaccard index by dividing the size of the intersection by the size of the union.

In a further variation, computing the metric value includes determining a size of the first set of data and determining a size of the second set of data. Also, determining whether the metric value exceeds a predetermined threshold includes determining that the difference between the size of the two sets is no greater than a predetermined quantity or percentage, or determining that the size of the first set exceeds the size of the second set by at least a predetermined quantity or percentage, or determining that the size of a second set exceeds the size of the first set by at least a predetermined quantity or percentage.

In a further variation, the metric is a size of the intersection between sets, and computing the metric value includes: computing a size of an intersection in a privacy-preserving way between the first set of data and the second set of data, without learning the contents of the second set of data and without revealing the contents of the first set of data to the potential partner during the computation.

In a further variation, the metric is a size of a union between sets, and computing the metric value includes: computing a size of an union between the first set of data and the second set of data.

In a further variation, the metric is a ratio of the size of the intersection over the size of the first set, or a ratio of the size of the intersection over the size of the second set. Further, computing the metric value includes: computing a size of an intersection between the first set of data and the second set of data, and performing one of: dividing the size of the intersection by the size of the first set, or dividing the size of intersection by the size of the second set.

In a further variation, the metric is any metric that can be computed in a privacy-preserving way, using either PSI, garbled circuits (GC), or Fully-Homomorphic Encryption (FHE) or other techniques, and determining whether the metric value exceeds a predetermined threshold includes comparing the metric value of the potential partner with metric values for one or more other potential partners.

In a further variation, the data is security log data, and the system changes network security rules and/or network security parameters for blocking and/or scrutinizing network addresses based on merged data that includes the first set of data and the second set of data.

In a further variation, the system negotiates on a merging process to share data with the potential partner. The negotiated merging process is one of the following processes: sharing all data with the potential partner, sharing only the most relevant data with the potential partner, or applying Private Set Intersection (PSI) to share only the data that is common to both the first set of data and the second set of data. The system then merges data with the potential partner according to the negotiated merging process.

BRIEF DESCRIPTION OF THE FIGURES

In the figures, like reference numerals refer to the same figure elements.

DETAILED DESCRIPTION

Figure 1:
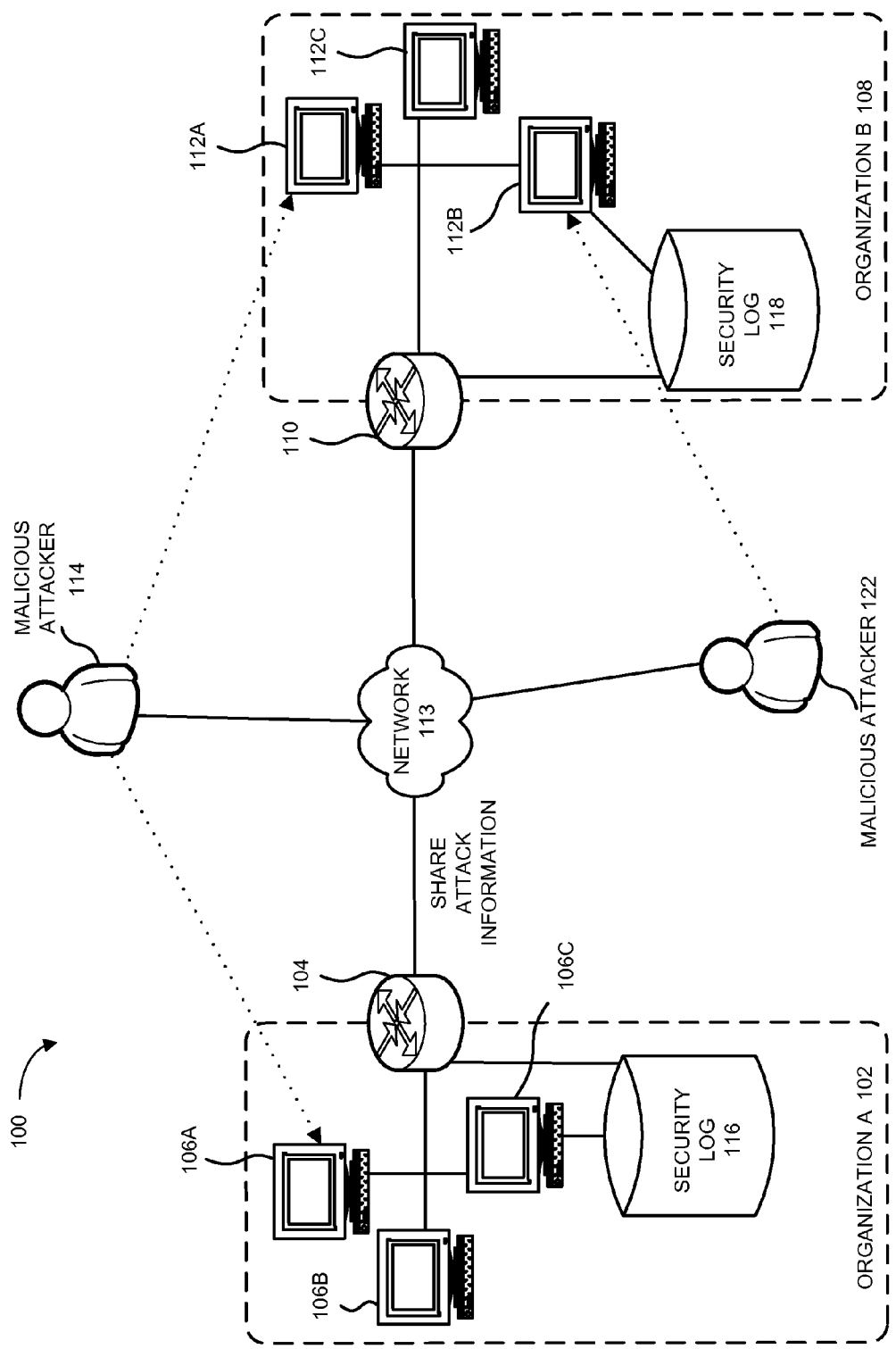
FIG. 1 presents a block diagram illustrating an exemplary architecture that facilitates privacy-preserving sharing of security data, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of incentivizing organizations to securely share security log data with each other by allowing an organization to estimate the benefits of sharing security log data with other organizations while preserving the privacy of security log data. After estimating the benefits of sharing data with other organizations, the organization may then choose to collaborate and merge security log data with one or more organizations using privacy-preserving techniques that allow the organization to share only the data that it intends to share. The privacy-preserving techniques allow the organization to maximize benefits of sharing and minimize exposure to risk, since the organization need not disclose more information than they intend to. The organization may utilize the security data to improve and/or update the detection and prediction of network threats and/or to gain a better understanding of past or present attacks, and/or to improve any other network security measures.

This disclosure presents a framework for privacy-preserving secure collaboration and data sharing. This framework includes a number of metrics and techniques for measuring data set similarity, dissimilarity, and correlation. The techniques facilitate establishment of trust through privacy-preserving identification of sharing partners in real-time, and reduces competitive risk through controlled and limited data sharing. The framework includes techniques for controlling how security log data, or a subset of the data, is shared to optimize benefit and risk during collaboration. The framework also includes techniques for using metrics to calculate risk and benefit measures associated with various potential sharing scenarios. Further, this framework facilitates a peer-to-peer approach to sharing security data, and does not require centralized control.

The techniques described herein rely on several building blocks from the machine learning and cryptographic community, including for example Private Set Intersection (PSI), Garbled Circuits, and Moving Window Aggregates. PSI is a protocol involving a client and server, that allows them to interact based on their respective input data sets, such that the client obtains nothing other than the set intersection, and the server learns nothing beyond the client's set size. A garbled circuit protocol allows two semi-honest parties, a circuit generator and a circuit evaluator, to compute an arbitrary function f(a,b), where a and b are private inputs from each party, without revealing any information about their respective secret inputs other than the function output.

This disclosure describes a number of metrics for estimating the benefits of sharing security log data with one or more organizations while maintaining the confidentiality of the security log data. Security log data is data stored in a log that describes network security-related activity, such as network attacks. An organization may store and analyze security log data in order to improve its network security. The security log may record network intrusion events or other security threats caused by malicious attackers. This information may include IP addresses of malicious attackers. Two organizations may share security log data by exchanging some information from their security logs with each other. This disclosure also includes a number of techniques for securely merging security log data so that no more than the intended amount of information is shared. Merging involves combining an organization's data with data from one or more organizations.

By sharing and merging security log data with other organizations, an organization can utilize other organizations' data to improve its own security. The organization can estimate benefits for sharing security log data with a number of other organizations, and choose to share security log data with the organizations that provide the most benefits. However, before an organization can share security log data with another organization, it must first determine whether there is sufficient benefit to sharing security log data with the other organization.

An organization can perform secure computations with other organizations to evaluate the benefit of sharing security log data without compromising the confidentiality of the security log data. A secure computation is a cryptographic technique that allows two parties, Alice and Bob, on input a and b, respectively, to jointly compute a public function f(a,b) in such a way that only the output of the function is reciprocally disclosed, without the need for a trusted third party. That is, the secure computation reveals no information about a to Bob and reveals no information about b to Alice.

There are a number of metrics for estimating the benefits of sharing security log data with another organization while maintaining the confidentiality of the data. For example, the organization can determine the size of the potential sharing partner's data set, and if that size is approximately equal to the size of the organization's own data set, then the organization may choose the potential partner for sharing security log data. As another example, the organization may choose a potential partner if the potential partner's data set and the organization's data set share a number of common data elements exceeding a predetermined threshold. A number of other example metrics are also discussed in this disclosure below.

After the organization decides to share security log data with another collaborating organization, the organization may then proceed to share and combine its data in a merging process. The disclosed framework supports a number of different techniques for merging data sets in a privacy-preserving manner, such that the merging process only discloses the data that the participating organizations have agreed to disclose. For example, if the collaborating organizations agree to disclose only data they have in common, the cryptographic techniques disclosed herein are guaranteed to disclose only the common elements (e.g., set intersection) between the data sets, and no other data.

Some examples of merging processes include share everything, share only the top k most relevant data, and share only common data. Two organizations may choose to share everything (e.g., share their entire data sets), although this is not sensitive to data privacy issues. This means that the organizations will perform a union (e.g., a∪b) of their data sets. As another example, the organizations may share only the top k most relevant data (e.g., top-k[a], top-k[b]). In yet another example, the organizations may use private set intersection to only share data describing common attacks (e.g., a∩b).

Some implementations may integrate the disclosed techniques in a firewall, and the firewall may be part of a router or other network appliance. The router may automatically execute the processes disclosed herein. Some organizations may also integrate the techniques on a server dedicated to storing the security log and exchanging security log data with other organizations.

Some organizations may implement the techniques disclosed herein in backbone routers. This can, for example, improve the effectiveness of measures to stop distributed denial-of-service attacks, which may include blocking network attacks before they reach a core router. These features may even be implemented across different carrier networks.

An administrator can turn on security log sharing features on the router, network appliance, or server to automatically execute the disclosed techniques. The administrator can also log onto a device and configure the stored IP addresses of other organizations' routers or other devices that implement the techniques disclosed herein. The devices can then communicate with the other organizations' devices to merge security log data. The devices can execute the sharing and merging processes in a few seconds, and can execute the processes every minute, or every hour, in order to generate instantaneous alerts of abnormal network traffic.

Figure 2:
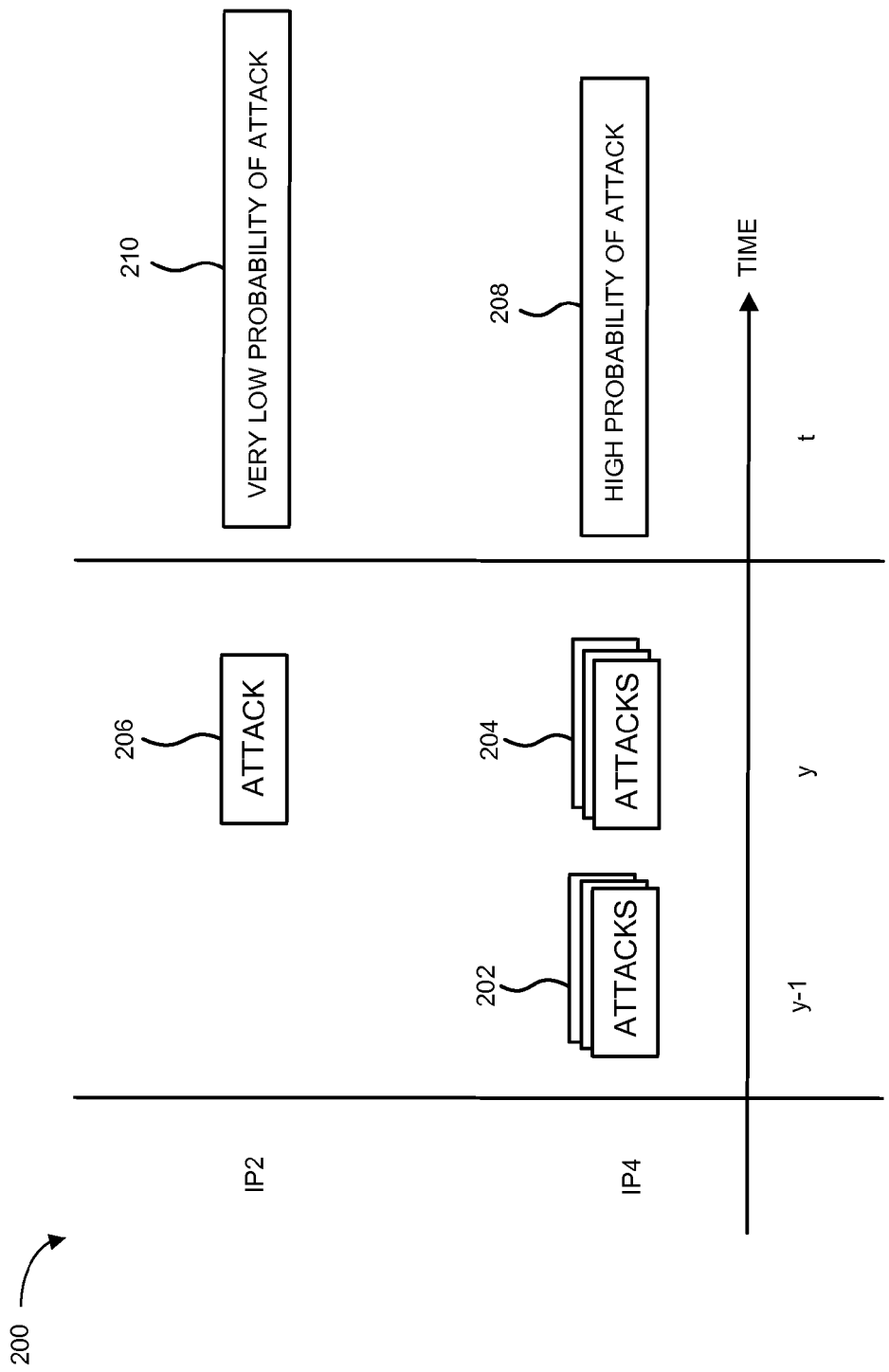
FIG. 2 presents a block diagram illustrating how organizations may predict attacks by sharing security data, in accordance with an embodiment.
Figure 3:
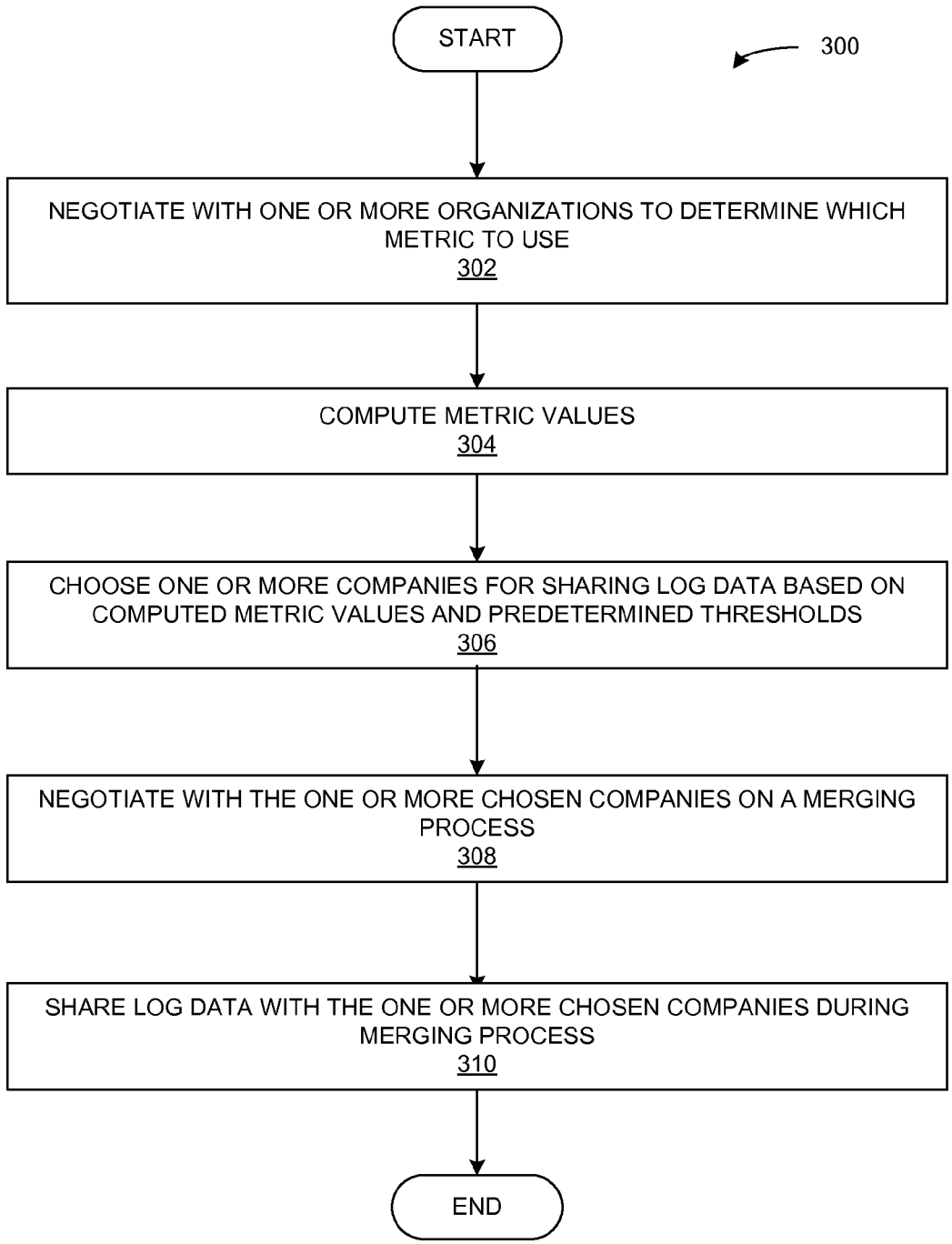
FIG. 3 presents a flowchart illustrating an exemplary process for sharing security data, according to an embodiment.

FIG. 1 illustrates an exemplary architecture that facilitates privacy-preserving sharing of security data. FIG. 2 illustrates an exemplary process for sharing security data. FIG. 3 illustrates how an organization may use security data shared by other organizations to predict attacks. FIG. 4 through FIG. 6 FIG. 7 illustrates an exemplary apparatus for privacy-preserving sharing of security data, and FIG. 8 illustrates a computer system for privacy-preserving sharing of security data.

System Architecture

FIG. 1 presents a block diagram illustrating an exemplary architecture 100 that facilitates privacy-preserving sharing of security data, according to an embodiment. In FIG. 1, two organizations (e.g., organization A and organization B) each maintain a respective security log with log entries describing network events, including security-related events such as network attacks. To improve their respective network security, the organizations may utilize the techniques discussed herein to share security log data with each other in real-time. In the exemplary architecture of FIG. 1, the organizations share their security log data with each other through their respective routers, although different implementations may utilize different types of devices to share security log data. Note that the one or more devices implementing the techniques disclosed herein may also be referred to as the system.

Organization A 102 deploys an internal network that includes router 104 and a plurality of computers 106A-106C. Organization B 108 deploys an internal network that includes router 110 and a plurality of computers 112A-112C. Routers 104, 110 may share security log data with each other over a network 113.

As an example of the type of data stored in the security logs, a malicious attacker 114 associated with an IP address has previously attacked computers 106A, 112A, and data describing the attacks have been stored in security logs 116, 118, respectively. Another malicious attacker 122 associated with another IP address has also previously attacked computer 112B, and data describing the attack has been stored in security log 118. The security logs 116, 118 may store data describing intrusion detection events or other network attacks by malicious attackers 114, 122 and/or data describing any other security-related events from any IP address.

Some organizations may run their software as cloud applications. For these organizations, a cloud node can collect threat information and share the information with other organizations.

Note that although the example described with respect to FIG. 1 involves routers exchanging security log data, embodiments of the present invention may utilize any computers and/or other machines to exchange threat information. Further, any number of organizations or parties can exchange data using the privacy-preserving techniques discussed herein.

Predicting Attacks by Sharing Security Data

FIG. 2 presents a block diagram 200 illustrating how organizations may predict attacks by sharing security data, in accordance with an embodiment. FIG. 2 illustrates an example scenario in which organization A may utilize the techniques disclosed herein to predict network attacks. In the scenario depicted in FIG. 2, two network addresses, IP2 and IP4, are potential sources of network attacks. If organization A merges its own security log data with log data received from other organizations, organization A can improve prediction of network attacks. For example, based on the security data received from other organizations and its own data, organization A may determine that IP4 has in the past attacked other organizations at times y−1 and y.

The boxes 202, 204 represent previous incidents of IP4 attacking some organizations at time y−1 and y, respectively. The box 206 represents a previous incident of IP2 attacking some organization at time y. Organization A may predict that there is a high probability of an attack at time t from IP4 (e.g., represented by box 208), and that there is a very low probability of an attack at time t from IP2 (e.g., represented by box 210). Router 104, which is associated with organization A, may then proactively block or filter packets coming from IP4 or at least scrutinize in detail the packets received from IP4. Router 104 may add IP4 to a list of blacklisted IP addresses. The organization may apply less scrutiny to packets coming from IP2 because the number of attacks coming from IP2 against other organizations was much less. The attack from IP2 may have been an isolated incident that organization A does not expect to repeat in the future. If organization A actually is a victim of an attack from IP4, then the prediction based on the merged log data is accurate. If organization A is not a victim of an attack from IP2, then a prediction of no attack from IP2 is also accurate.

Although the examples use IP addresses to identify attackers, potential sources of attacks can be identified by other than IP addresses, including unique attacker identifiers associated with one or more potential sources of attacks. Organizations can compute metrics and share information describing potential sources of attacks regardless of how the source of attack is identified.

Process for Sharing Data Sets

FIG. 3 presents a flowchart illustrating an exemplary process for sharing security data, according to an embodiment. Generally, if two organizations each determine that they will benefit from receiving the other's security data, then they may choose to share their respective data with each other. In the flowchart of FIG. 3, organization A determines the benefits of sharing security data with a number of other organizations, and then exchanges security data with those organizations that will provide the greatest benefit.

Figure 4:
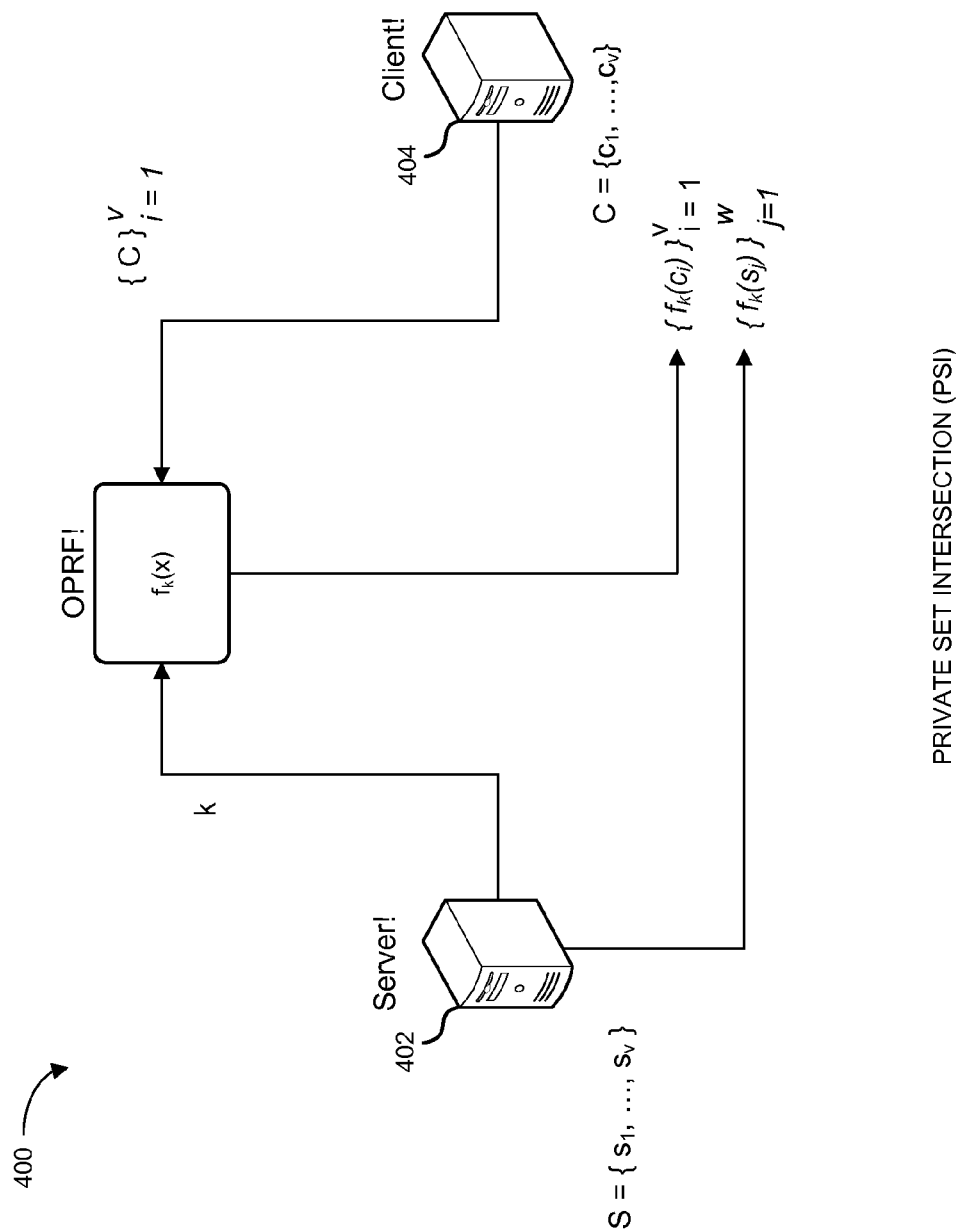
FIG. 4 presents a block diagram illustrating an Oblivious Pseudo-Random Function (OPRF)—based PSI protocol, according to an embodiment.
Figure 5:
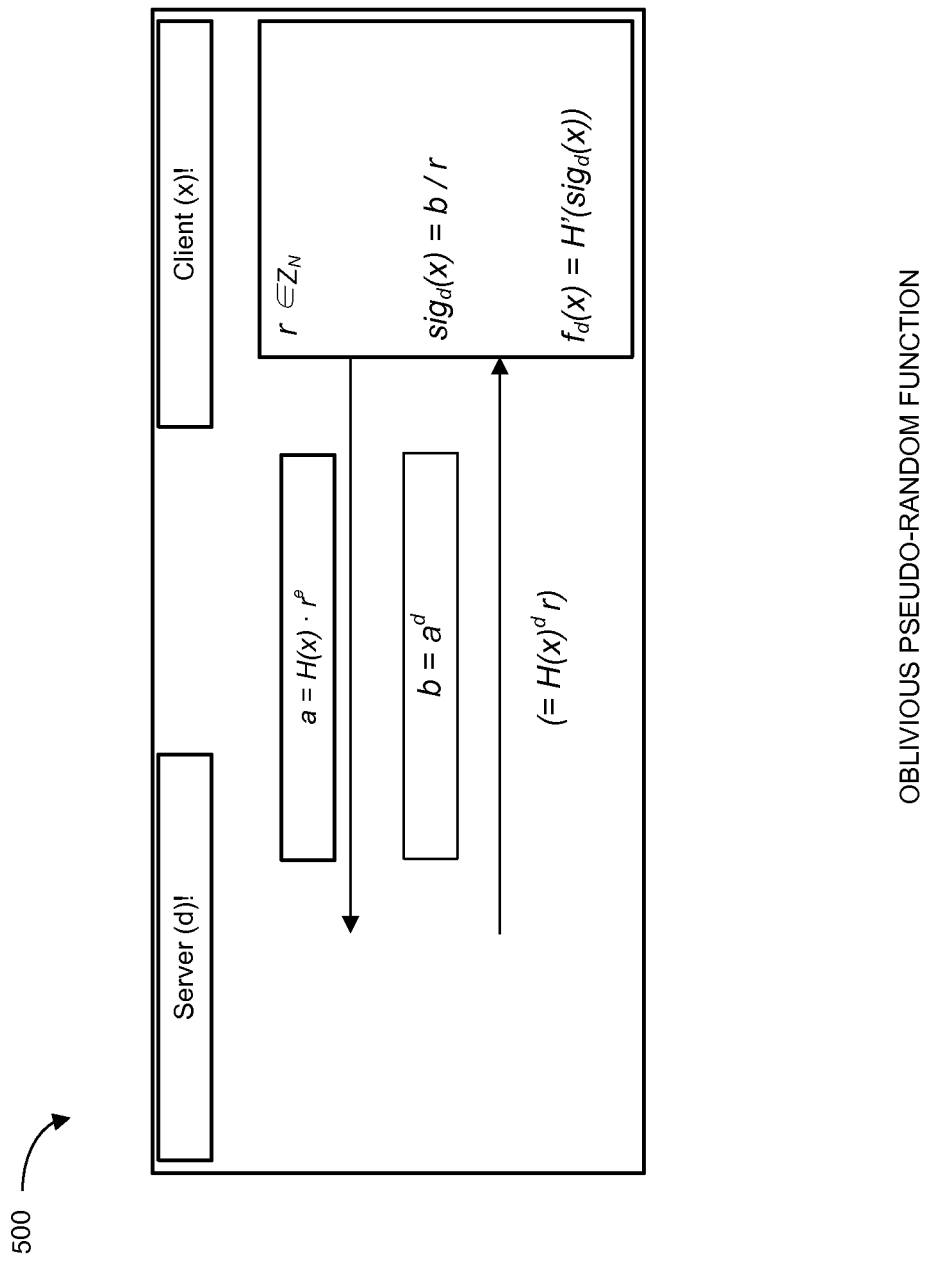
FIG. 5 presents a block diagram illustrating building an OPRF from a pseudorandom function (PRF), in accordance with an embodiment.
Figure 6:
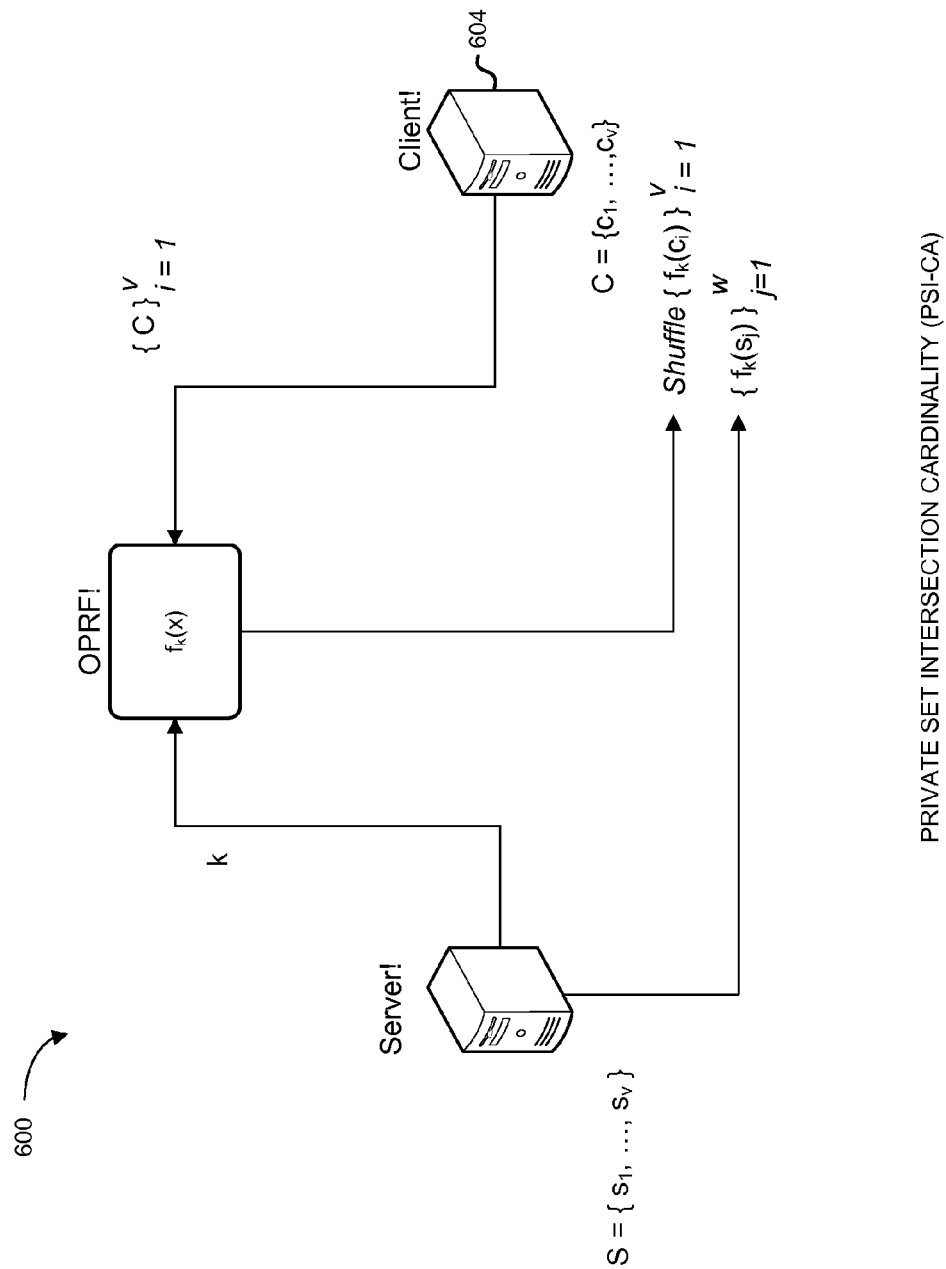
FIG. 6 presents a block diagram illustrating the computation of Private Set Intersection Cardinality (PSI-CA), in accordance with an embodiment.

During operation, organization A may initially negotiate with one or more organizations to determine which metric to use for determining the benefits of sharing with each respective organization (operation 302). The metrics disclosed herein include a comparison of the relative size of data sets, size of intersection of data sets, size of union of data sets, Jaccard index, and others. Organization A may compute one or more metric values to determine the benefit of sharing security data with the other organizations (operation 304). The organizations may compute the metric values using their own data set and, in some cases, encrypted/obfuscated data received from another organization. FIG. 4 to FIG. 6 illustrates some example metric value computations and the accompanying descriptions explain the intuition behind the metric value computations.

Next, organization A may choose to share security data with one or more organizations (operation 306). Organization A may require that the computed metric values associated with an organization satisfy some criteria in order to share data with that organization. Organization A may require a metric value to exceed a predetermined threshold before sharing with the associated organization. For example, organization A may choose to share security data with another organization if such sharing provides the maximum amount of benefit in comparison with other organizations. In some cases, the organization may choose to share log data with the top k companies that provide the most benefit according to computed metric values. Some organizations may choose to always collaborate with all possible partners. This provides high benefits with high risks. Other organizations may choose to never share information, which is low risk but provides little or no benefit.

Subsequently, organization A may negotiate with the chosen organizations on a merging process for sharing security log data (operation 308). Some examples of merging processes include sharing everything (e.g., share the union a∪b), sharing only the top-k most relevant data elements (e.g., share top-k[a], top-k[b]), and sharing common attacks and timings (e.g., share the intersection a∩b). For share everything and share only the top-k most important data elements, organization A can then send the data to the other organization. For sharing common attacks and timings, organization A may apply PSI to share the security log data, so that the other organization only receives the intersection data.

Two organizations can negotiate and further define the subset of data that is to be shared. Organization A may share a subset of the security log data using a combination of the merging processes disclosed above and rule-based filtering. For example, organization A may choose not to share log data that is more than six weeks old using a combination of set intersection and rule-based filtering.

Organization A may then share log data with one or more chosen organizations during the merging process (operation 308). During the merging process, organization A sends security log data to one or more organizations, and the organizations send their own security log data to organization A. Organization A may filter some of the security log data that it sends to other organizations, in order to protect the privacy of the security log data. The actual data that organization A sends to another organization depends on the agreed-upon merging process. The section below discusses some of the similarity functions that serve as metrics, and how to perform the associated computations.

Organization A may utilize a number of privacy-preserving metrics, each of which can be any of the similarity functions listed below. Some of these metrics are symmetric, while others are asymmetric. With the symmetric metrics, two organizations will compute the same value. With the asymmetric metrics, the two organizations will compute different values for the metric. Note that the similarity functions reveal no more than its output, thereby preserving privacy of the security data. The metrics are:

|a|≈|b|: For this metric, organization A may share security log data with organization B if the size of organization A's data set is approximately equal to the size of organization B's data set. In some implementations, the size of two data sets are approximately equal if the difference between the number of elements in each data set does not exceed a predetermined threshold. Organization A and organization B may share with each other the size of their data set. This is not a symmetric metric as each organization might have a different data set size.

a∩b: For this metric, organization A may share security log with organization B if the intersection of data sets contains enough interesting elements exceeding a predetermined threshold. The details for applying PSI to compute the size of a set are described with respect to FIG. 4 and FIG. 5. This is not a symmetric metric, as each organization might consider different elements as interesting.

|a∩b|: For this metric, organization A may share security data if the size of the intersection of data sets exceeds a predetermined threshold. Organization A may apply Private Set Intersection Cardinality (PSI-CA) to compute this intersection size. PSI-CA is a PSI variant that only discloses the size of the set intersection. FIG. 6 and the accompanying text explains the computations involved for PSI-CA. Note that this is a symmetric metric, and two organizations will compute the same value.

|a∩b|: For this metric, organization A may share security data if the size of the union of data sets exceeds a predetermined threshold. Organization A may apply PSI-CA to privately calculate |a∩b|, then calculate |a∪b|=|a|+|b|−|a∩b|. Note that this is also a symmetric metric, and two organizations will compute the same value.

Jaccard(a,b)=|a∩b|/|a∪b|, or Jaccard(a,b)=|a∩b|/|a∪b|: For this metric, organization A may share security data if the Jaccard index exceeds a predetermined threshold. Organization A may compute the Jaccard index by applying PSI-CA to calculate |a∩b| and |a∪b|, as indicated above. Note that this is also a symmetric metric, and two organizations will compute the same value.

|a|<<|b| or |b|<<|a|: For this metric, organization A may share security data if the size of set a is less than the size of set b, and the difference between the size of the sets exceeds a threshold difference value. In some cases, organization A may prefer to share security data if the size of set b is less than the size of set a, and the difference between the size of the sets exceeds a threshold difference value.

|a∩b|/|a|: For this metric, organization A may share security data if the value of |a∩b|/|a| exceeds a predetermined threshold. Organization A may apply PSI-CA to compute the intersection size.

|a∩b|/|b|: For this metric, organization A may share security data if the value of |a∩b|/|b| exceeds a predetermined threshold. Organization A may apply PSI-CA to compute the intersection size and the size of set b.

Some implementations may also utilize other metrics such as Pearson index, Covariance, Cosine, Sorensen-Dice index, Mutual Information, Kullback-Leibler (KL) Divergence, Jensen-Shannon (JS) Divergence, SimRank, Tanimoto measure, Stochastic/Deterministic Sign Change, and Entropy. Note that the techniques disclosed herein can be applied to any metric that can be computed in a privacy-preserving way, using either PSI, garbled circuits (GC), or Fully-Homomorphic Encryption (FHE) or other techniques.

FIG. 4 presents a block diagram 400 illustrating an Oblivious Pseudo-Random Function (OPRF)—based PSI protocol, according to an embodiment. An important tool for privacy-preserving computation of the similarity functions is PSI. PSI is a protocol involving a server 402 and a client 404, with inputs $S=\{s_1, \ldots, s_w\}$ and $C=\{c_1, \ldots, c_v\}$, respectively, that results in client 404 computing the contents of S∩C, while the server only computes the size of set C. Client 404 and server 402 can belong to two organizations that are evaluating the possibility of sharing security log data with each other. One can utilize OPRFs to implement PSI. An OPRF is a two-party protocol that securely computes a pseudo-random function $f_k(x)$ on key k contributed by a sender and input x contributed by a receiver, such that the former learns nothing from the interaction and the latter learns only the value $f_k(x)$. The intuition behind OPRF-based PSI protocols is illustrated in FIG. 4.

As illustrated in FIG. 4, server 402 and client 404 interact in v parallel executions of the OPRF $f_k(\ )$ on input k and $c_i$, for all $c_i$ in C (i=1, ..., v), respectively. As server 402 transfers $f_k(s_j)$, for all $s_j$ in S, and client 404 obtains $f_k(c_i)$, for all $c_i$ in C, client 404 learns the set intersection by finding matching $(f_k(c_i), f_k(s_j))$ pairs, while it learns nothing about values $s_1$ outside the intersection since $f_k(s_1)$ is indistinguishable from random, if $f_k(\ )$ is a pseudo-random function.

FIG. 5 presents a block diagram 500 illustrating building an OPRF from a pseudorandom function (PRF), in accordance with an embodiment. To construct an efficient OPRF, the inventors use a technique based on RSA Signatures. A system can construct the PRF as $f_d(x)=H'(sig_d(x))$, where d is the RSA private signing key (held by server 402), and H' is a cryptographic hash function. The inventors build an OPRF from the PRF as illustrated in FIG. 5, where the system executes operations modulo N (part of the RSA public key, along with e), H is a cryptographic function, and r is a random value taken from $Z_N$.

FIG. 6 presents a block diagram 600 illustrating the computation of Private Set Intersection Cardinality (PSI-CA), in accordance with an embodiment. Some metrics utilize a PSI variant that only discloses the size of the set intersection, called PSI-CA. For PSI-CA, a client 604 only computes the size of the intersection (e.g., |S∩C|) and not the actual content of the intersection. The technique is illustrated in FIG. 6. The main difference compared with the original OPRF-based PSI construction is that the system shuffles the outputs of the OPRF function at random before the output is received by client 604. Consequently, client 604 can no longer reconstruct which items generated $f_k(c_i)$ by matching $(f_k(c_i), f_k(s_j))$ pairs. Client 604 cannot learn which specific items belong to the intersection. Client 604 can only learn the number of items that belong to the intersection.

Software Prototype and Use Case

To test the inventors' hypothesis, the inventors experimented the disclosed techniques on a real data set of malicious web behavior. The inventors obtained some sample firewall logs from DShield, a third party security provider, that contained data on 2 billion attacks by 16 million malicious IP addresses over the course of two months on 800,000 victims. Each attack identifies an IP address that contacted a victim and showed malicious intent. Malicious IP addresses are an important source of information as they identify the source of malicious traffic and can be proactively blocked to thwart future attacks.

The experiment's aim was to predict future attacks before they occur. The inventors used a prediction technique that aggregated past attacks in order to estimate the likelihood of future attacks. The implementation included the select and merge techniques disclosed herein, with all the aforementioned metrics as well as all merging techniques.

The results showed significant increase in predictive success in comparison to non-collaborative scenarios. The improvement in predictive success can be >50%, and, in some cases, 90% or 100%. The techniques disclosed herein were able to combine information in a privacy-preserving manner and dramatically increase prediction performance. This highlights the tremendous potential of the disclosed technology.

Exemplary Apparatus

Figure 7:
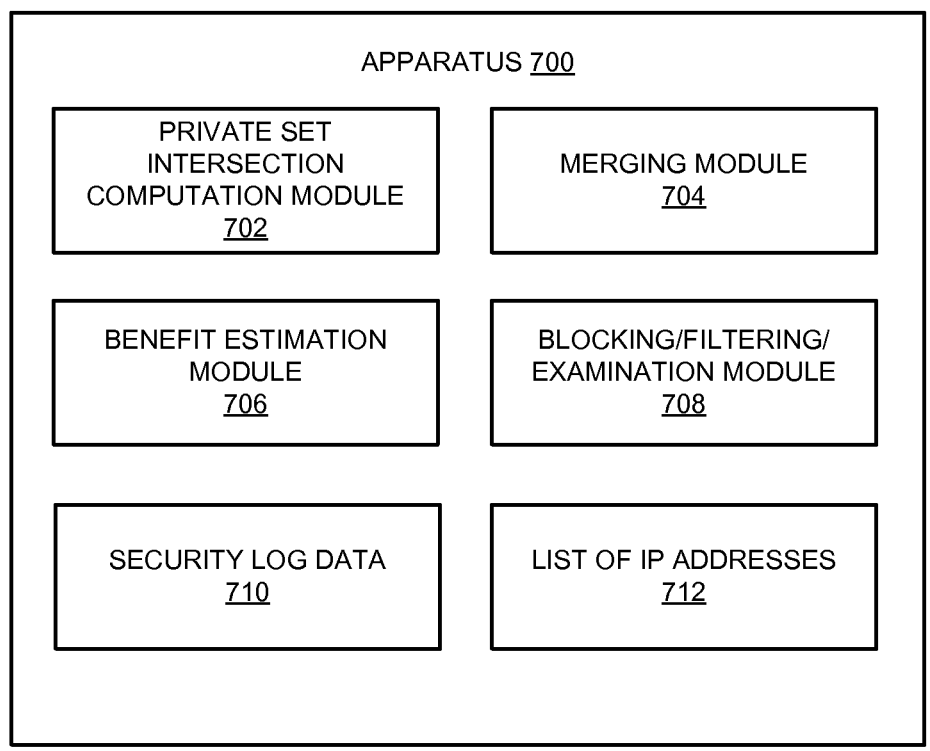
FIG. 7 presents a block diagram illustrating an exemplary apparatus for privacy-preserving sharing of security data, in accordance with an embodiment.
Figure 8:
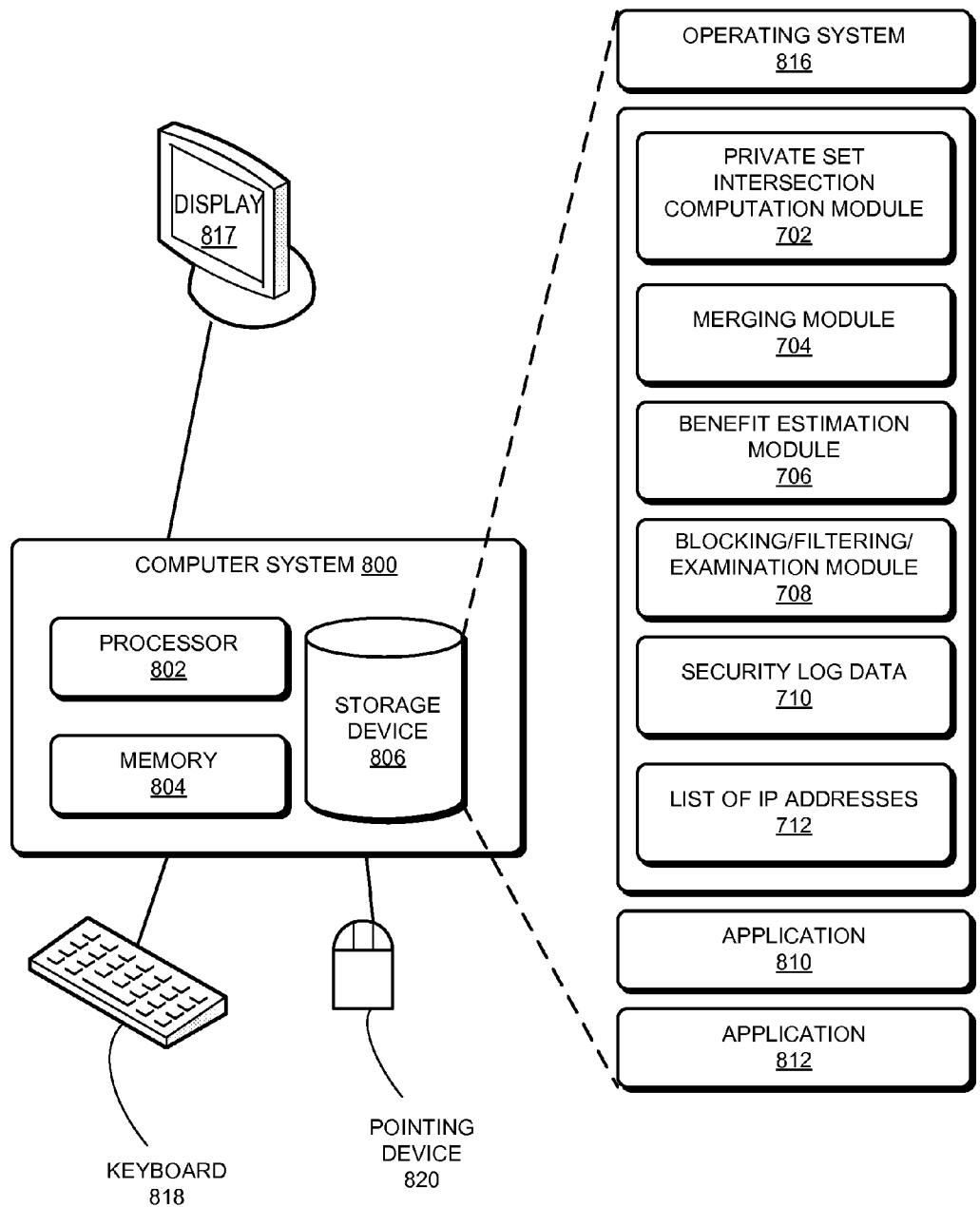
FIG. 8 illustrates an exemplary computer system that facilitates privacy-preserving sharing of security log data, in accordance with an embodiment.

FIG. 7 presents a block diagram illustrating an exemplary apparatus 700 for privacy-preserving sharing of security data, in accordance with an embodiment. The privacy-preserving sharing and merging techniques disclosed herein may be implemented in a router, switch, specialized computer system, or some other telecommunication device or machine. Apparatus 700 can be an example of a router or other network device implementing the disclosed techniques.

Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices.

Specifically, apparatus 700 can comprise a private set intersection computation module 702, merging module 704, benefit estimation module 706, blocking/filtering/examination module 708, security log data 710, and list of IP addresses 712. Note that apparatus 700 may also include additional modules and data not depicted in FIG. 7, and different implementations may arrange functionality according to a different set of modules. Embodiments of the present invention are not limited to any particular arrangement of modules.

Private set intersection computation module 702 executes private set intersection computations as part of computing metrics. Merging module 704 merges security data from apparatus 700 with other device's security data. Benefit estimation module 706 collaborates with other sharing devices to estimate the benefits from merging. Blocking/filtering/examination module 708 may block/filter/examine traffic coming from IP addresses that are deemed to be suspicious based on merged data. Blocking/filtering/examination module 708 may store a blacklist of IP addresses. Security log data 710 stores the security log data. List of IP addresses 712 stores the IP addresses of routers or other devices of other organizations to enable sharing and merging of security log data.

Exemplary Computer System

FIG. 8 illustrates an exemplary computer system 800 that facilitates privacy-preserving sharing of security log data, in accordance with an embodiment. Computer system 800 can be an example of a specialized computer system that provides privacy-preserving sharing functionality in some implementations. In one embodiment, computer system 800 includes a processor 802, a memory 804, and a storage device 806. Storage device 806 stores a number of applications, such as applications 810 and 812 and operating system 816. Storage device 806 also stores private set intersection computation module 702, merging module 704, benefit estimation module 706, blocking/filtering/examination module 708, security log data 710, and list of IP addresses 712. During operation, one or more applications, such as benefit estimation module 706, are loaded from storage device 806 into memory 804 and then executed by processor 802. While executing the program, processor 802 performs the aforementioned functions. Computer and communication system 800 may be coupled to an optional display 817, keyboard 818, and pointing device 820.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for privacy-preserving sharing of security log data for secure collaboration, comprising:
   obtaining a first set of log data describing network events associated with one or more network addresses;
   negotiating, by a computer with a potential partner, to determine a metric for estimating a benefit of sharing data, wherein the potential partner is associated with a second set of log data describing network events associated with one or more network addresses;
   computing, by the computer, a metric value that preserves the privacy of the first set of log data, based on at least the first set of log data;
   determining whether the metric value exceeds a predetermined threshold for the determined metric; and
   responsive to determining that the metric value exceeds the predetermined threshold, negotiating, by the computer with the potential partner, to select a merging process for sharing data with the potential partner;
   determining a set of rules for sharing data during the merging process; and
   merging data from the first set of log data with the potential partner according to the set of rules and the negotiated merging process.

2. The method of claim 1, wherein the metric is a Jaccard index, and wherein computing the metric value comprises:
   computing a size of an intersection between the first set of log data and the second set of log data while preserving the privacy of the first set of log data;
   computing the size of the union between the first set of log data and the second set of log data by adding the size of the first set of log data to the size of the second set of log data and subtracting the size of the intersection; and
   computing the Jaccard index by dividing the size of the intersection by the size of the union.

3. The method of claim 1, wherein computing the metric value comprises:
   determining a size of the first set of log data and determining a size of the second set of log data; and
   wherein determining whether the metric value exceeds a predetermined threshold comprises:
   determining that the difference between the size of the two sets is no greater than a predetermined quantity or percentage, or
   determining that the size of the first set exceeds the size of the second set by at least a predetermined quantity or percentage, or
   determining that the size of a second set exceeds the size of the first set by at least a predetermined quantity or percentage.

4. The method of claim 1, wherein the metric is a size of the intersection between sets, and wherein computing the metric value comprises:
   computing a size of an intersection between the first set of log data and the second set of log data, without learning the contents of the second set of log data and without revealing the contents of the first set of log data to the potential partner during the computation.

5. The method of claim 1, wherein the metric is a size of a union between sets, and wherein computing the metric value comprises:
   computing a size of an union between the first set of log data and the second set of log data.

6. The method of claim 1, wherein the metric is a ratio of the size of the intersection over the size of the first set, or a ratio of the size of the intersection over the size of the second set, and wherein computing the metric value comprises:
   computing a size of an intersection between the first set of log data and the second set of log data; and performing one of:
   dividing the size of the intersection by the size of the first set, or
   dividing the size of intersection by the size of the second set.

7. The method of claim 1, wherein the metric is any metric that can be computed while preserving the privacy of the first set of log data, using either PSI, garbled circuits (GC), or Fully-Homomorphic Encryption (FHE) or other techniques, and wherein determining whether the metric value exceeds a predetermined threshold comprises comparing the metric value of the potential partner with metric values for one or more other potential partners.

8. The method of claim 1, further comprising:
changing network security rules and/or network security parameters for blocking and/or scrutinizing network addresses based on merged data that includes the first set of log data and the second set of log data.

9. The method of claim 1, wherein the negotiated merging process is one of a plurality of candidate merging processes.

10. The method of claim 1,
wherein negotiating to select a merging process involves selecting at least one of the following processes:
sharing all log data with the potential partner;
sharing only the most relevant log data with the potential partner; or
applying Private Set Intersection (PSI) to share only the log data that is common to both the first set of log data and the second set of log data.

11. A non-transitory computer-readable storage medium storing instructions that when executed by a computer cause the computer to perform a method for privacy-preserving sharing of security log data for secure collaboration, the method comprising:
obtaining a first set of log data describing network events associated with one or more network addresses;
negotiating, by the computer with a potential partner, to determine a metric for estimating a benefit of sharing data, wherein the potential partner is associated with a second set of log data describing network events associated with one or more network addresses;
computing a metric value that preserves the privacy of the first set of log data, based on at least the first set of log data;
determining whether the metric value exceeds a predetermined threshold for the determined metric; and
responsive to determining that the metric value exceeds the predetermined threshold, negotiating, by the computer with the potential partner, to select a merging process for sharing data with the potential partner;
determining a set of rules for sharing data during the merging process; and
merging data from the first set of log data with the potential partner according to the set of rules and the negotiated merging process.

12. The non-transitory computer-readable storage medium of claim 11, wherein the metric is a Jaccard index, and wherein computing the metric value comprises:
computing a size of an intersection between the first set of log data and the second set of log data while preserving the privacy of the first set of log data;
computing the size of the union between the first set of log data and the second set of log data by adding the size of the first set of log data to the size of the second set of log data and subtracting the size of the intersection; and
computing the Jaccard index by dividing the size of the intersection by the size of the union.

13. The non-transitory computer-readable storage medium of claim 11, wherein computing the metric value comprises:
determining a size of the first set of log data and determining a size of the second set of log data; and
wherein determining whether the metric value exceeds a predetermined threshold comprises:
determining that the difference between the size of the two sets is no greater than a predetermined quantity or percentage, or
determining that the size of the first set exceeds the size of the second set by at least a predetermined quantity or percentage, or
determining that the size of a second set exceeds the size of the first set by at least a predetermined quantity or percentage.

14. The non-transitory computer-readable storage medium of claim 11, wherein the metric is a size of the intersection between sets, and wherein computing the metric value comprises:
computing a size of an intersection between the first set of log data and the second set of log data, without learning the contents of the second set of log data and without revealing the contents of the first set of log data to the potential partner during the computation.

15. The non-transitory computer-readable storage medium of claim 11, wherein the metric is a size of a union between sets, and wherein computing the metric value comprises:
computing a size of an union between the first set of log data and the second set of log data.

16. The non-transitory computer-readable storage medium of claim 11, wherein the metric is a ratio of the size of the intersection over the size of the first set, or a ratio of the size of the intersection over the size of the second set, and wherein computing the metric value comprises:
computing a size of an intersection between the first set of log data and the second set of log data; and performing one of:
dividing the size of the intersection by the size of the first set, or
dividing the size of intersection by the size of the second set.

17. The non-transitory computer-readable storage medium of claim 11, wherein the metric is any metric that can be computed while preserving the privacy of the first set of log data, using either PSI, garbled circuits (GC), or Fully-Homomorphic Encryption (FHE) or other techniques, and wherein determining whether the metric value exceeds a predetermined threshold comprises comparing the metric value of the potential partner with metric values for one or more other potential partners.

18. The non-transitory computer-readable storage medium of claim 11, further comprising:
changing network security rules and/or network security parameters for blocking and/or scrutinizing network addresses based on merged data that includes the first set of log data and the second set of log data.

19. The non-transitory computer-readable storage medium of claim 11,
wherein negotiating to select a merging process involves selecting one of the following processes:
sharing all log data with the potential partner,
sharing only the most relevant log data with the potential partner, or
applying PSI to share only the log data that is common to both the first set of log data and the second set of log data.

20. A computing system for privacy-preserving sharing of security log data for secure collaboration, the system comprising:
one or more processors,
a non-transitory computer-readable medium coupled to the one or more processors having instructions stored thereon that, when executed by the one or more processors, cause the one or more processors to perform operations comprising:

obtaining a first set of log data describing network events associated with one or more network addresses;

negotiating, by a computer with a potential partner, to determine a metric for estimating a benefit of sharing data, wherein the potential partner is associated with a second set of log data describing network events associated with one or more network addresses;

computing, by the computer, a metric value that preserves the privacy of the first set of log data, based on at least the first set of log data;

determining whether the metric value exceeds a predetermined threshold for the determined metric; and responsive to determining that the metric value exceeds the predetermined threshold, negotiating, by the computer with the potential partner, to select a merging process for sharing data with the potential partner;

determining a set of rules for sharing data during the merging process; and merging data from the first set of log data with the potential partner according to the set of rules and the negotiated merging process.

21. The computing system of claim 20, wherein the metric is a Jaccard index, and wherein computing the metric value comprises:

computing a size of an intersection between the first set of log data and the second set of log data while preserving the privacy of the first set of log data;

computing the size of the union between the first set of log data and the second set of log data by adding the size of the first set of log data to the size of the second set of log data and subtracting the size of the intersection; and computing the Jaccard index by dividing the size of the intersection by the size of the union.

22. The computing system of claim 20, wherein computing the metric value comprises:

determining a size of the first set of log data and determining a size of the second set of log data; and wherein determining whether the metric value exceeds a predetermined threshold comprises:

determining that the difference between the size of the two sets is no greater than a predetermined quantity or percentage, or determining that the size of the first set exceeds the size of the second set by at least a predetermined quantity or percentage, or determining that the size of a second set exceeds the size of the first set by at least a predetermined quantity or percentage.

23. The computing system of claim 20, wherein the metric is a size of the intersection between sets, and wherein computing the metric value comprises:

computing a size of an intersection between the first set of log data and the second set of log data, without learning the contents of the second set of log data and without revealing the contents of the first set of log data to the potential partner during the computation.

24. The computing system of claim 20, wherein negotiating to select a merging process involves selecting one of the following processes:

sharing all log data with the potential partner, sharing only the most relevant log data with the potential partner, or applying PSI to share only the log data that is common to both the first set of log data and the second set of log data.

* * * * *